(12) United States Patent
Borisenko et al.

(10) Patent No.: US 10,601,582 B2
(45) Date of Patent: Mar. 24, 2020

(54) METHOD OF LINEAR TRANSFORMATION (VARIANTS)

(71) Applicant: Joint Stock Company "InfoTeCS", Moscow (RU)

(72) Inventors: Nikolay Pavlovich Borisenko, Orel (RU); Alexey Viktorovich Urivskiy, Moscow region (RU)

(73) Assignee: Joint Stock Company "InfoTeCS", Moscow (RU)

( * ) Notice: Subject to any disclaimer, the term of this patent is extended or adjusted under 35 U.S.C. 154(b) by 64 days.

(21) Appl. No.: 15/513,823

(22) PCT Filed: Jul. 26, 2016

(86) PCT No.: PCT/RU2016/050024
§ 371 (c)(1),
(2) Date: Mar. 23, 2017

(87) PCT Pub. No.: WO2017/023195
PCT Pub. Date: Feb. 9, 2017

(65) Prior Publication Data
US 2017/0295011 A1  Oct. 12, 2017

(30) Foreign Application Priority Data
Jul. 31, 2015 (RU) .................... 2015131963

(51) Int. Cl.
*H04L 9/06* (2006.01)
*G06F 7/76* (2006.01)
*G06F 9/30* (2018.01)

(52) U.S. Cl.
CPC ............. *H04L 9/0631* (2013.01); *G06F 7/76* (2013.01); *G06F 9/30101* (2013.01); *H04L 9/06* (2013.01); *H04L 2209/12* (2013.01)

(58) Field of Classification Search
CPC ..... H04L 9/0631; H04L 9/06; H04L 2209/12; G06F 7/76; G06F 9/30101
(Continued)

(56) References Cited

U.S. PATENT DOCUMENTS 5,946,473 A 8/1999 Lotspiech et al.
6,925,563 B1 * 8/2005 Jennings ............... H04L 9/0894
708/491

(Continued)

FOREIGN PATENT DOCUMENTS

EP 1514174 B1 11/2005
RU 2296427 C1 3/2007
(Continued)

OTHER PUBLICATIONS

Examination Report dated Jul. 31, 2015, issued by the Russian Patent Office (in Russian language) for Russian Patent Application RU2015131963; 2 pages.
(Continued)

*Primary Examiner* — Michael Pyzocha
*Assistant Examiner* — Zoha Piyadehghibi Tafaghodi
(74) *Attorney, Agent, or Firm* — Faegre Drinker Biddle & Reath LLP

(57) ABSTRACT

The invention relates to the field of computer engineering and cryptography and, in particular, to methods for implementing linear transformations that operate with a specified speed and require minimum amount of memory, for further usage in devices for cryptographic protection of data. The technical result enables the selection of interrelated parameters (performance and required amount of memory) for a particular computing system when implementing a high-dimensional linear transformation. The use of the present method allows for a reduction of the amount of consumed memory at a given word size of processors employed. To
(Continued)

US 10,601,582 B2

Page 2 this end, based on a specified linear transformation, a modified linear shift register of Galois-type or Fibonacci-type is generated according to the rules provided in the disclosed method, and the usage thereof enables to obtain the indicated technical result.

2 Claims, 8 Drawing Sheets

(58) Field of Classification Search
USPC .......................................................... 380/58
See application file for complete search history.

(56) References Cited

U.S. PATENT DOCUMENTS

| | | | | |
|---|---|---|---|---|
| 2002/0051534 A1* | 5/2002 | Matchett | ............... | H04L 9/0625 380/37 |
| 2008/0240426 A1* | 10/2008 | Gueron | ............... | G06F 12/0875 380/44 |
| 2010/0058477 A1* | 3/2010 | Ciet | ......................... | G06F 7/00 726/26 |
| 2010/0278338 A1* | 11/2010 | Chang | ..................... | G09C 1/00 380/200 |
| 2014/0079215 A1 | 3/2014 | Wei et al. | | |

FOREIGN PATENT DOCUMENTS

| | | |
|---|---|---|
| WO | WO 99/45670 A2 | 9/1999 |
| WO | WO 2010/132895 A1 | 11/2010 |

OTHER PUBLICATIONS

Borisenko, Nicolay et al., "Developing algorithm for software and hardware implementation of large size linear mapping", 2nd Workshop on Current Trends in Cryptology (CTCrypt 2013), Jun. 23-25, 2013, Ekaterinburg, Russia, Pre-proceedings, pp. 192-205.

Borodin, Mikhail et al., "High-Speed Software Implementation of the Prospective 128-bit Block Cipher and Streebog Hash-Function", 3rd Workshop on Current Trends in Cryptology (CTCrypt 2014), Jun. 5-6, 2014, Moscow, Russia, Pre-proceedings, pp. 189-197.

Kuzmin, A. S. et al, "Linear recurring sequences over Galois rings", Algebra and Logic, 3:2 (1995), pp. 169-189.

Couselo, E. et al., "A. Recursive MDS-codes and recursively differentiable quasigroups. Discrete Mathematics", vol. 10, Issue 2, 1998, pp. 3-29.

International Search Report and Written Opinion, issued by the Russian Patent Office (in Russian language), dated Dec. 8, 2016, for International Application No. PCT/RU2016/050024; 6 pages.

English translation of the International Search Report, issued by the Russian Patent Office, dated Dec. 8, 2016, for International Application No. PCT/RU2016/050024; 1 page.

Kuzmin, A.S., et al., "Linear Recurring Sequences Over Galois Rings," Algebra and Logic, vol. 34, No. 2, 1995.

Couselo, E., et al., "Recursive MDS-codes and recursive differentiable quasigroups," Discrete Math. Appl, vol. 8, No. 3, pp. 217-245 (1998).

* cited by examiner

METHOD OF LINEAR TRANSFORMATION (VARIANTS)

CROSS REFERENCE TO RELATED APPLICATIONS

This application is a U.S. National Stage Application of International Patent Application No. PCT/RU2016/050024, filed Jul. 26, 2016, which claims priority to Russian Patent Application No. 2015131963, filed Jul. 31, 2015, each of which is expressly incorporated by reference herein in its entirety.

FIELD OF THE INVENTION

The invention relates to the field of computer engineering and cryptography and, in particular, to the use of shift registers for implementing high-dimensional linear transformations to be used subsequently in devices for cryptographic protection of data.

DESCRIPTION OF THE RELATED ART

A variety of methods for performing linear transformations are used for cryptographic protection of data.

A conventional method that improves both software and hardware implementation of a fixed linear transformation of the AES cipher is based on, the use of a specific form of a linear transformation matrix. The known method relates to cryptography and can be also used for software or hardware implementations in information security systems [1].

Other methods of linear transformations are also known in the art [2-4].

However, the known methods suffer from disadvantages in that they can not be used for performing arbitrary linear transformations, including high-dimensional ones, and that they inefficiently use resources in some computing platforms.

The use of linear feedback shift registers (LFSR) shows potential for implementing linear transformations [5]. Such registers, carried out by software or hardware and capable of operating in both the forward and reverse directions, can be implemented in a variety of computing platforms (FIGS. 1 to 4).

A great number of scientific works were published, which proposed implementation of linear transformations based on various LFSRs, including LFSRs of the Galois and Fibonacci type.

But such linear transformations are typically low-dimensional. When building a diffusion layer of a cryptographic transformation, e.g. a block cipher or a hash function, they do not allow to process the entire block of high dimension and require an additional linear transformation to enhance the security level, for example, in the AES standard this is the ShiftRows ( ) function, in the block cipher LED—the ShiftCells ( ) function, in the hash function of GOST R 34.11-2012—the byte permutation function. Generally, the use of low-dimensional linear transformations is compensated for by increasing the number of cryptographic transformation rounds to achieve higher strength, which leads to lower performance.

The method according to [2] that allows to efficiently implement a LFSR is the most relevant, in the technical sense, to the present invention, said method performing a linear operation and being applicable for linear transformation. The method is based on using separable tables and provided for implementing LFSRs only in a binary field. This method is regarded as the closest prior art.

Another known method according to [3] allows to implement a high dimensional LFSR and requires little memory, but is slow, while the method according to [4] is fast, but requires too much memory.

The disadvantage of the closest prior art and the known techniques listed above is the impossibility to select parameters of a computing system for efficient use of its resources, and this fact does not allow to reduce the number of required operating cycles to be used in a processor system to compute the transformation result.

SUMMARY OF THE INVENTION

The technical result refers to enabling to select interrelated parameters (performance and required amount of memory) for a particular computing system when implementing a high-dimensional linear transformation.

To this end, a method is provided that enables to perform a linear transformation of an original message using a Galois-type LFSR (FIGS. 1, 2) or a Fibonacci-type LFSR (FIGS. 3, 4).

Furthermore, knowing a processor word size and an amount of memory allocated for performing the method, it can be determined in advance how many LFSR cycles are required to compute the linear transformation of the original message.

An embodiment of the method involves generating a Galois-type LFSR and a linear transformation of a message S represented in a binary form, the method comprising:

setting a word size W of a processor of a computing system equal to an integer power of 2;

setting an available amount of memory of the computing system of M bits;

setting a size s of the message S, where s is multiple of W;

setting a value n of a number of bits of a linear feedback shift register (LFSR) according to a Galois configuration (FIGS. 1, 2), so that $$n = \frac{W}{2^N}$$

is met,
where $N \in 0, 1, 2, \ldots$,
generating the LFSR according to the Galois configuration with the following parameters:
an internal primitive polynomial $$f(x) = x^n \oplus \sum_{i=0}^{n-1} a_i x^i,$$

$$a_i \in GF(2)$$

an external polynomial $$h(y) = y^m \oplus \sum_{i=0}^{m-1} h_i y^i,$$

where $m = \frac{s}{n}$ is a number of stages in the LFSR, while $h_i \in GF(2^n)$ an initial state of stages of the LFSR, $q_i$, forms a data vector $$X=(q_{m-1}, q_{m-2}, \ldots, q_2, q_1, q_0),$$

where $q_i \in GF(2^n)$, $0 \leq i \leq m-1$
an output state of the stages of the LFSR, $q'_i$, for one operating cycle forms a vector $$Y=(q'_{m-1}, q'_{m-2}, \ldots, q'_2, q'_1, q'_0), \text{ while}$$

$q'_i \in GF(2^n)$, $0 \leq i \leq m-1$,
where $q'_i = h_i \cdot q_{m-1} \oplus q_{i-1}$, for $1 \leq i \leq m-1$,
$q'_0 = h_0 \cdot q_{m-1}$
defining all divisors of the number m as values $p_0$, $p_1, \ldots, p_d$, where $p_0 < p_1 < \ldots p_d$;
selecting a maximum possible divisor p from $$p \leq \frac{M}{sn};$$

modifying the LFSR by performing the following actions:
  computing R matrices $H_r$, where $r=(R-1), \ldots, 0$, with a size of n×k rows, each having a length of n×k bits, by performing the following actions:
  computing k=p,
  computing $$R = \frac{m}{k},$$

where R is a number of matrices H;
  computing j=m-k;
  computing t=0;
  (A1) if j≤m-1 is not met,
    then going to step A3;
    computing l=0,
  (A2) if l<n is not met,
    then computing j=j+1,
      t=t+1,
    going to step A1;
  setting an initial state of the LFSR $$X = (q_{m-1}, \ldots, q_1, q_0),$$

$$q_i = \begin{cases} 0, 0 \leq i \leq j-1 \text{ or } j+1 \leq i \leq m-1 \\ 2^l, i = j, \end{cases}, 0 \leq i \leq m-1,$$

where $q_i \in GF(2^n)$, computing, after k operating cycles for each initial state, a new state of the LFSR $$Y=(q'_{m-1}, \ldots, q'_1, q'_0),$$

where $q'_i \in GF(2^n)$, $0 \leq i \leq m-1$,
  computing t-th values for all matrices $H_i$, i=r-1 ... 0 by concatenating k values of stages q'

$$H_{r,i} = q'_{kr+k-1} \| \ldots \| q'_{kr},$$

while $0 \leq r \delta R-1$
computing l=l+1,
going to step A2;

(A3) recording, into stages of the modified LFSR, blocks s of the original message S, where an initial state of the stages of the modified LFSR, $q_i$, forms a vector $$X=(Q_{R-1}, \ldots, Q_1, Q_0),$$

where $Q_r$ is contents of stages $q_{kr+k-1} \| \ldots \| q_{kr}$, while $0 \leq r \leq R-1$
performing R operating cycles of the modified LFSR by performing, at each cycle, the following actions:
  computing an output state of the stages of the modified LFSR $Q'_i$ for one cycle, thereby forming a vector $$Y=(Q'_{R-1}, \ldots, Q'_1, Q'_0),$$

each value $Q'_i$ of said vector being computed according to the formula $$Q'_i = f(H_i) \oplus Q_{i-1}$$

for each i=R-1, ..., 1,
  while $Q'_0 = f(H_0)$,
  where $$f(H_r) = \bigoplus_{j=0}^{W-1} z_{R-1,j} \cdot H_{r,j},$$

where $z_{R-1,j}$ is a value of j-th bit of a vector $Q_{R-1}$, while r=R-, ..., 1, 0,
    j=0, 1, ..., W-1,
    $z_{R-1,j} \in GF(2)$;
  obtaining, after the R operating cycles of the LFSR, a linear transformation of blocks s of the message S;
  reading out, from the stages of the modified LFSR, blocks of a linearly transformed message S;
  combining the blocks and obtaining the linearly transformed message S.

According to another embodiment, the method involves generating a Fibonacci-type LFSR and a linear transformation of a message S represented in a binary form, the method comprising:
  setting a word size W of a processor of the computing system equal to an integer power of 2;
  setting an available amount of memory of the computing system of M bits;
  setting a size s of the message S, where s is multiple of W;
  setting a value n of a number of bits of a linear feedback shift register (LFSR) according to a Fibonacci configuration (FIGS. 3, 4) so that $$n = \frac{W}{2^N}$$

is met,
  where $N \in 0, 1, 2, \ldots$,
  generating the LFSR according to the Fibonacci configuration with the following parameters:
    an internal primitive polynomial $$f(x) = x^n \oplus \sum_{i=0}^{n-1} a_i x^i,$$

$a_i \in GF(2)$ an external polynomial $$h(y) = y^m \oplus \sum_{i=0}^{m-1} h_i y^i,$$

where $m = \frac{s}{n}$ is a number of stages in the LFSR,
while $h_i \in GF(2^n)$
an initial state of the stages of the LFSR, $q_i$, forms a vector $$X = (q_{m-1}, q_{m-2}, \ldots, q_2, q_1, q_0),$$

while $q_i \in GF(2^n)$, $0 \leq i \leq m-1$
an output state of the stages of the LFSR, $q'_i$, for one operating cycle, forms a vector $$Y = (q'_{m-1}, q'_{m-2}, \ldots, q'_2, q'_1, q'_0),$$

while $q'_i \in GF(2^n)$, $0 \leq i \leq m-1$,
where $q'_i = q_{i+1}$,
for each $i = 0, \ldots, m-2$ $$q'_{m-1} = \bigoplus_{i=0}^{m-1} h_i \cdot q_i$$

defining all divisors of the number m as values $p_0, p_1, \ldots, p_d$, where $p_0 < p_1 < \ldots p_d$;
selecting a maximum possible divisor p from $$p \leq \frac{M}{sn};$$

modifying the LFSR by performing the following actions:
computing R matrices $H_r$, where $r = (R-1), \ldots, 0$, with a size of n×k rows, each having a length of n×k bits, by performing the following steps:
computing k=p,
computing $$R = \frac{m}{k},$$

where R is a number of matrices $H_r$;
computing r=0;
(A5) if r<R is not met, then going to step A7;
computing j=0,
(A6) if j<k is not met, then computing r=r+1, going to step A5;
computing l=0,
if l<n is not met, then computing j=j+1,
going to step A6;
setting an initial state of the LFSR $$X = (q_{m-1}, q_{m-2}, \ldots, q_1, q_0),$$

$$q_i = \begin{cases} 2^l, & i = rk + j, \\ 0, & \text{otherwise} \end{cases}, 0 \leq i \leq m-1,$$

where $q_i \in GF(2^n)$;

computing, after k operating cycles for each initial state, a new state of the LFSR $$Y = (q'_{m-1}, q'_{m-2}, \ldots, q'_1, q'_0),$$

where $q'_i \in GF(2^n)$, $0 \leq i \leq m-1$;
computing a (jk+l)-th value for a matrix $H_r$ by concatenating k values of stages $q'_{m-1}, q'_{m-2}, \ldots, q'_{m-k}$ $$H_{r,t} = q'_{kr+k-1} \| \ldots \| q'_{kr},$$

where $0 \leq r \leq R-1$;
computing l=l+1,
going to step A6;
(A7) recording, into stages of the modified LFSR, blocks s of the original message S, where an initial state of the stages of the modified LFSR, $q_i$, forms a vector $$X = (Q_{R-1}, \ldots, Q_1, Q_0),$$

where $Q_r = q_{kr+k-1} \| \ldots \| q_{kr}$,
while $0 \leq r \leq R-1$;
performing R operating cycles of the modified LFSR by performing, at each cycle, the following actions:
computing an output state of the stages of the modified LFSR $Q'_i$ for one cycle, thereby forming a vector $$Y = (Q'_{R-1}, \ldots, Q'_1, Q'_0),$$

each value $Q'_i$ of said vector being computed by the formula $$Q'_i = Q_{i+1}$$

for each $i = 0, \ldots, R-2$,
and $Q'_{R-1} = Q'_{m-1}$,
and a value $Q'_{m-1}$ computed from $$Q'_{m-1} = \bigoplus_{r=0}^{R-1} f(H_r),$$

where $$f(H_r) = \bigoplus_{j=0}^{W-1} z_{r,j} \cdot H_{r,j},$$

where $z_{r,j}$ is a value of a j-th bit of a vector $Q_r$,
while $r = R-1, \ldots, 1, 0$,
$j = 0, 1, \ldots, W-1$,
$z_{r,j} \in GF(2)$;
obtaining, after the R operating cycles of the LFSR, a linear transformation of the blocks s of the message S;
reading out, from the stages of the modified LFSR, blocks s of a linearly transformed message S;
combining the blocks and obtaining the linearly transformed message S.

To implement the present method using a Galois-type LFSR, the LFSR is modified.

The principal distinction of the modified Galois LFSR is in the way of computing a feedback function value. In the modified Galois LFSR, feedback function values of the register are computed from tables, depending on values of bits of the high stage of the register.

An initial linear transformation is $L: V_s \mapsto V_s$. The transformation L is set based on the Galois LFSR over a composite field $GF((2^n)^m)$, where $s = m \times n$, using the internal primitive polynomial $$f(x) = x^n \oplus \Sigma_{i=0}^{n-1} a_i x^i,$$

where $a_i \in GF(2)$,
and the external irreducible polynomial $$h(y) = y^m \oplus \Sigma_{i=0}^{m-1} h_i y^i,$$

where $h_i \in GF(2^n)$ and $h_0 = 1$.

The initial state of the stages of the Galois LFSR, $q_i$, forms a data vector $$X = (q_{m-1}, q_{m-2}, \ldots, q_2, q_1, q_0),$$

where $q_i \in GF(2^n)$, $0 \le i \le m-1$.

Elements of the composite field $GF((2^n)^m)$ are also computed using the following linear feedback shift register (hereinafter LFSR) of the Galois configuration based on the polynomials $f(x)$ and $h(y)$ [4].

The linear transformation L of the original data vector $X = (q_{m-1}, q_{m-2}, \ldots, q_2, q_1, q_0)$ refers herein to the result of m in cycles of the LFSR.

The output state of the stages of the Galois LFSR, $q'_i$, for one operating cycle, forms the vector $$Y = (q'_{m-1}, q'_{m-2}, \ldots, q'_2, q'_1, q'_0),$$

where $q'_i \in GF(2^n)$, $0 \le i \le m-1$,
and each value $q'_i$ is computed by the formula $$q'_i = h_i \cdot q_{m-1} \oplus q_{i-1}$$

for each $i = m-1, \ldots, 1$ and $q'_0 = h_0 \cdot q_{m-1}$.

The operations of adding and multiplying two n-bit numbers in the Galois LFSR are performed in the field $GF(2^n)$. The linear transformation of the original data vector is performed in m cycles of the Galois-type LFSR.

The transformation results in a new state of the register at the m-th cycle. A reverse linear transformation $L^{-1}$ is performed in m cycles of the LFSR in the reverse direction.

Let $p_0, p_1, \ldots, p_d$ are all divisors of the number m, while $p_0 < p_1 < \ldots p_d$. Let us denote values $$k = p_i, R = \frac{m}{k} \text{ and } W = nk,$$

where W is the word size of the processor which performs the initial linear transformation, $p_i$ is selected based on the amount of available memory M. FIG. 5 shows a general configuration of the modified Galois LFSR.

Let the initial state of the stages of the modified Galois LFSR form the vector $$X' = (Q_{R-1}, \ldots, Q_1, Q_0),$$

where $Q_r$ is equal to the content of stages $q_{kr+k-1} \| \ldots \| q_{kr}$, while $0 \le r \le R-1$.

The output state of the stages of the modified Galois LFSR $Q'_i$, for one operating cycle, forms the vector $Y' = (Q'_{R-1}, \ldots, Q'_1, Q'_0)$, and each value $Q'_i$ for each $r = R-1, \ldots, 1$ is computed by the formula $$Q'_r = f(H_r) \oplus Q_{r-1}$$

while $Q'_0 = f(H_0)$, and the function is defined as:

$$f(H_r) = \bigoplus_{j=0}^{W-1} z_{R-1,j} \cdot H_{r,j},$$

where $r = R-1, \ldots, 1, 0,$ $z_{R-1,j} \in GF(2),$ $j = 0, 1, \ldots, W-1$ are bits of stage $Q_{R-1}$ of the modified Galois LFSR.

If the state at the m-th cycle is the result of the linear transformation L according to the Galois LFSR configuration (FIG. 1), then the same state will be obtained at the R-th cycle of the modified Galois LFSR (FIG. 5). Moreover, R cycles of the modified LFSR require $$R \cdot W = \frac{m}{k} \cdot n \cdot k = m \cdot n$$

"true-false" check operations for all bits of the stage $Q_{R-1}$. The number of modulo-2 additions of W-bit numbers for each computation of the value $f(H_r)$ from each table is equal to W−1. Therefore, each operating cycle of the modified Galois LFSR requires the following number of additions:

$$R(W-1) + R - 1 = RW - 1 = \frac{m}{k} nk - 1 = mn - 1$$

As a result, the required number of modulo-2 additions of W-bit numbers for R cycles of the modified Galois LFSR is equal to $$R(mn-1) = \frac{m(mn-1)}{k}$$

The required memory amount is $$M = R \cdot W \cdot W = \frac{m}{k} \cdot (n \cdot k)^2 = m \cdot n^2 \cdot k \text{ (bits)}$$

to store R tables $H_r = 15, \ldots, 0$.

For proper functioning of the configuration of FIG. 5 according to the rule of the configuration of FIG. 1 (obtaining the same output for the same input data), it is necessary to determine R tables $H_r$, $r = (R-1), \ldots, 0$. FIG. 6 shows the flowchart for calculating them.

The sequence of calculation of R tables $H_r$, $r = (R-1), \ldots, 0$ is based on the principle of superposition of linear transformations. Input data of the algorithm is a linear transformation over the specified composite field $GF((2^n)^m)$, and p is any one of divisors of the number m. Output data is R required tables $H_r$, $r = (R-1), \ldots, 0$.

Every step of the algorithm (FIG. 6) will be considered hereinbelow.

Step 1 [Block 2]: Assigning values $$k = p, R = \frac{m}{k}, j = m - k,$$

and t=0;
Step 2 [Item A—Block 3]: Checking the condition j≤m−1
if the condition is met, assigning l=0 (Block 4) and going to Step 3 [Item B];
if the condition is not met, completing the process;
Step 3 [Item B—Block 5] Checking the condition l<n
if the condition is met,
determining the initial state of the Galois LFSR (Block 6):

$$q_i = \begin{cases} 0, & 0 \le i \le j-1 \text{ or } j+1 \le i \le m-1 \\ 2^l, & i = j, \end{cases}, 0 \le i \le m-1,$$

computing the new state $Y=(q'_{m-1}, \ldots, q'_1, q'_0)$ of the Galois LFSR after k operating cycles for each initial state $X=(q_{m-1}, \ldots, q_1, q_0)$, where $q_i, q'_i \in GF(2^n)$, 0≤i≤m−1 (Block 7),
computing t-th values for all tables H by concatenating k values of the stages q' (Block 8);

$$H_{r,t} = q'_{kr+k-1} \| \ldots \| q'_{kr}, 0 \le r \le R-1,$$

incrementing the value l=l+1 (Block 9), and going to Step 3 [Item B];
if the condition is not met, incrementing the values j=j+1, t=t+1 (Block 10), and going to Step 2 [Item A].
The order of computing the required tables for the reverse linear transformation $L^{-1}$ is the same. But in this case the resulting modified Galois-type LFSR will operate in the reverse direction with the "true-false" check for all bits of the stage $Q_0$ instead of $Q_{R-1}$.
If the linear transformation $L:V_s \mapsto V_s$ is set based on the Fibonacci LFSR over the composite field $GF((2^n)^m)$, where s=m×n, using the internal primitive polynomial $$f(x) = x^n \oplus \Sigma_{i=0}^{n-1} a_i x^i,$$

where $a_i \in GF(2)$,
and the external irreducible polynomial $$h(y) = y^m \oplus \Sigma_{i=0}^{m-1} h_i y^i,$$

where $h_i \in GF(2^n)$ and $h_0 = 1$,
then it can be implemented according to the modified Fibonacci LFSR configuration.
The initial state of the stages of the Fibonacci LFSR, $q_i$, forms the data vector $$X = (q_{m-1}, q_{m-2}, \ldots, q_2, q_1, q_0),$$

where $q_i \in GF(2^n)$, 0≤i≤m−1
The output state of the stages of the Fibonacci LFSR, $q'_i$, for one operating cycle, forms the vector $$Y = (q'_{m-1}, q'_{m-2}, \ldots, q'_2, q'_1, q'_0),$$

where $q'_i \in GF(2^n)$, 0≤i≤m−1
and each value $q'_i$ is computed by the formula $$q'_i = q_{i+1}$$

for each i=0, ..., m−2 and $$q'_{m-1} = \bigoplus_{i=0}^{m-1} h_i \cdot q_i.$$

The operations of adding and multiplying two n-bit numbers in the Fibonacci LFSR are performed in the field $GF(2^n)$. The linear transformation of the original data vector takes in cycles of the Fibonacci LFSR (FIG. 3). The transformation results in a new state of the register at the m-th cycle. A reverse linear transformation $L^{-1}$ is attained after m cycles of the Fibonacci LFSR in the reverse direction (FIG. 4).
In this case, the modified Fibonacci LFSR has a general configuration shown in FIG. 7.
Let the initial state of the stages of the modified Fibonacci LFSR form the vector $$X = (Q_{R-1}, \ldots, Q_1, Q_0),$$

where $Q_r = q_{kr+k-1} \| \ldots \| q_{kr}$, 0≤r≤R−1
The output state of the stages $Q'_i$ for one operating cycle forms the vector $$Y = (Q'_{R-1}, \ldots, Q'_1, Q'_0),$$

and each value $Q'_i$ is computed by the formula $Q'_r = Q_{r+1}$ for each r=0, ..., R−2 and $$Q'_{R-1} = \bigoplus_{r=0}^{R-1} f(H_r),$$

$$f(H_r) = \bigoplus_{j=0}^{W-1} z_{r,j} \cdot H_{r,j},$$

where $r = R-1, \ldots, 1, 0,$ $z_{r,j} \in GF(2),$ j=0, 1, ..., W−1-bits of stage $Q_r$ of the modified Fibonacci LFSR.
If the state at the m-th cycle is the result of the linear mapping L according to the Fibonacci LFSR configuration in FIG. 3, then the state at the R-th cycle corresponds to its result according to the modified Fibonacci LFSR configuration in FIG. 7. Moreover, R cycles of its operation require $$R \cdot R \cdot W = \left(\frac{m}{k}\right)^2 \cdot n \cdot k = \frac{m^2 \cdot n}{k}$$

"true-false" check operations. The number of modulo-2 additions of W-bit numbers for computing each value $f(H_r)$ from each table is equal to W−1. Therefore, each cycle of the modified Fibonacci LFSR requires $$R(W-1) + R - 1 = RW - 1 = \frac{m}{k}nk = 1 = mn - 1$$

operations of modulo-2 addition of W-bit numbers. As a result, the number of modulo-2 additions of W-bit numbers for R cycles of the register is $$R(mn-1) = \frac{m(mn-1)}{k}$$

The required memory amount is $$R \cdot W \cdot W = \frac{m}{k} \cdot (n \cdot k)^2 = m \cdot n^2 \cdot k \text{ (bits)}$$

for storing R tables $H_r$, r=15, ..., 0.

For correct operation of the modified configuration it is, necessary to determine R tables $H_r$, r=(R−1), ..., 0. FIG. 8 shows the flowchart for computing them.

The algorithm for computing R tables $H_r$, r=(R−1), ..., 0 is also based on the principle of superposition of linear transformations. Input data of the algorithm is a linear transformation over the specified composite field $GF((2^n)^m)$ that is provided according to the Fibonacci LFSR, and p is any one of divisors of the number m. Output data is R required tables $H_r$, r=(R−1), ..., 0.

Every step of the algorithm is considered hereinbelow.

Step 1 [Block 2]; Assigning values $$k = p, R = \frac{m}{k}, \text{ and } r = 0;$$

Step 2 [Item A—Block 3]: Checking the condition r<R
if the condition is met, assigning j=0 (Block 4) and going to Step 3 [Item B],
if the condition is not met, completing the process;
Step 3 [Item B—Block 5] Check condition j<k
if the condition is met, assigning l=0 (Block 6) and going to Step 4 [Item B];
if the condition is not met, incrementing the value r=r+1 (Block 12), and going to Step 2 [Item A];
Step 4 [Item B—Block 7] Checking the condition l<n
if the condition is met,
determining the initial state of the Fibonacci LFSR (Block 8):

$$q_i = \begin{cases} 2^l, & l = rk + j, \\ 0, & \text{otherwise} \end{cases}, 0 \le i \le m-1,$$

computing the new state $Y=(q'_{m-1}, \ldots, q'_1, q'_0)$ of the Fibonacci LFSR after k operating cycles for each initial state $X=(q_{m-1}, \ldots, q_1, q_0)$, where $q_i$, $q'_i \in GF(2^n)$, $0 \le i \le m-1$ (Block 9)
computing the (jk+l)-th value for table $H_r$ by concatenating k values of the stages $q'_{m-1}, q'_{m-2}, \ldots, q'_{m-k}$ (Block 10)

$$H_{r,jk+l} = q'_{m-1} \| \ldots \| q'_{m-k}$$

incrementing the value l=l+1 (Block 10), and going to Step 4 [Item B];
if the condition is not met, incrementing the value j=j+1 (Block 11), and going Step 3 [Item B].

The order of computing the required tables for the inverse linear mapping $L^{-1}$ is the same. But in such a case it would be necessary to use the Fibonacci LFSR configuration (FIG. 4) to compute its state (lock 9, FIG. 8). The resulting modified LFSR is shifted in the opposite direction.

DESCRIPTION OF EMBODIMENTS OF THE INVENTION

An exemplary implementation of the present method using a modified Galois-type LFSR will be described hereinbelow.

The present method can be implemented in an application for a computing system, and a computer with one processor that has the word size of 8-bit and higher and operates under control of an operating system (for example, Microsoft Windows 7) can serve as such a computing system.

The application for implementing operation of a Galois (or Fibonacci)-type LFSR can be developed by an artisan skilled in the field of programming based on the knowledge of conventional principles and structures of a LFSR of an appropriate type and the steps of the method provided hereby.

Figure 9:
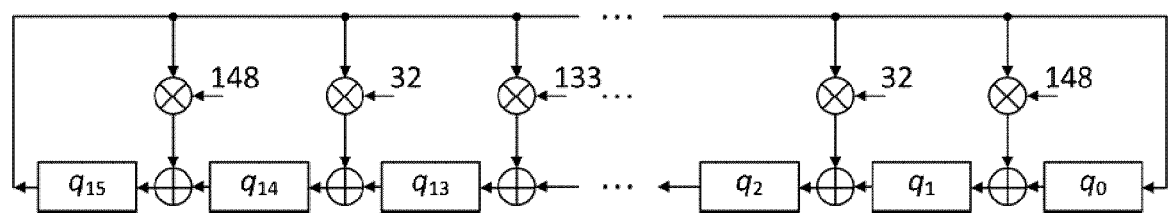
FIG. 9 shows a schematic diagram of a Galois-type linear feedback shift register for a forward linear transformation, illustrating an embodiment of the method.
Figure 10:
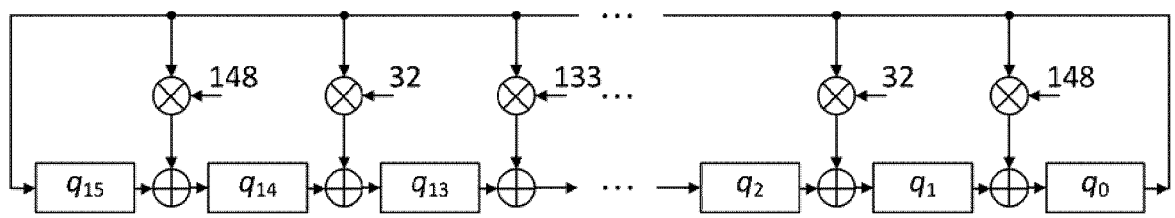
FIG. 10 shows a schematic diagram of a Galois-type linear feedback shift register for a reverse linear transformation, illustrating an embodiment of the method.
Figure 11:
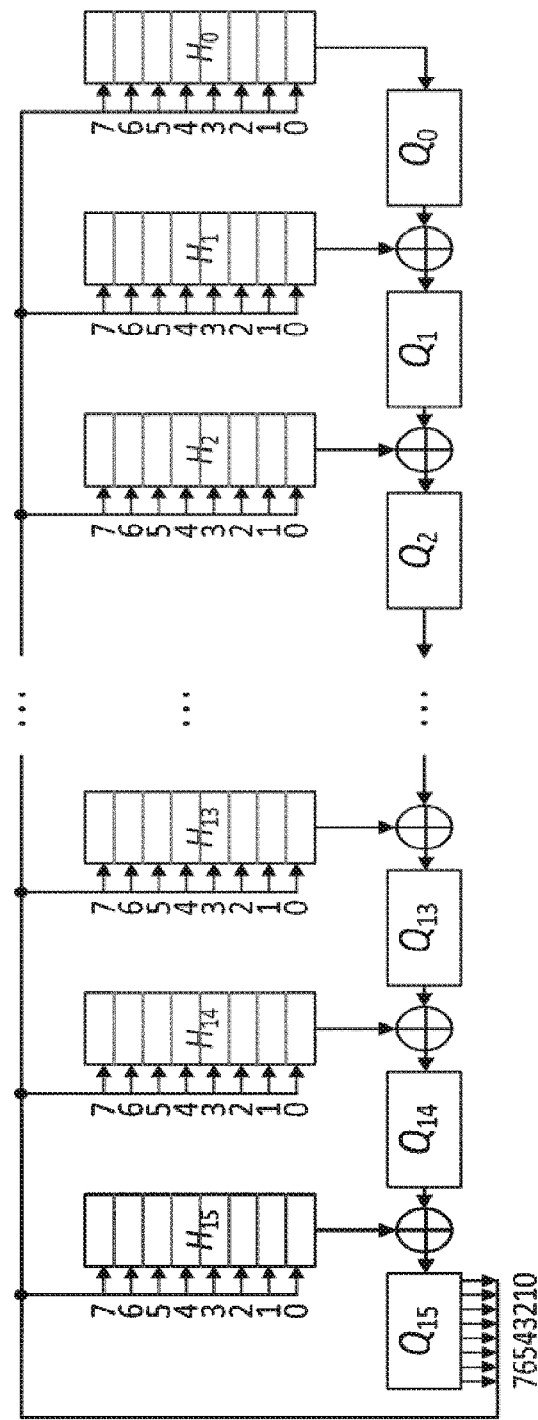
FIG. 11 shows a workflow of a modified Galois-type linear feedback shift register for a forward linear transformation, illustrating an embodiment of the method.

For the sake of convenience in analysis and synthesis, the description of the invention considers a linear transformation L with specific parameters typical to a large class of cryptographic algorithms:

an initial linear transformation $L: V_{128} \mapsto V_{128}$;
a composite field $GF((2^8)^{16})$ (m=16, n=8);

an internal primitive polynomial $$f(x) = x^8 \oplus x^7 \oplus x^6 \oplus x \oplus 1$$

for generating the field $GF(2^8)$;
an external irreducible polynomial h(y) for generating the composite field $GF((2^8)^{16})$ $$h(j) = y^{16} + 148y^{15} + 32y^{14} + 133y^{13} + 16y^{12} + 194y^{11} + 192y^{10} + y^9 + 251y^8 + y^7 + 192y^6 + 194y^5 + 16y^4 + 133y^3 + 32y^2 + 148y + 1,$$

where
$(h_{15}, h_{14}, \ldots, h_0) = (148, 32, 133, 16, 194, 192, 1, 251, 1, 192, 194, 16, 133, 32, 148, 1)$ $h_i \varepsilon GF(2^8)$ FIG. 9 and FIG. 10 show a LFSR configuration for the forward transformation L and a LFSR configuration for a reverse transformation $L^{-1}$, respectively.

A useful property for a linear transformation has been recently discovered in cryptography: if any sequence of symbols is recorded into stages of a LFSR and the register is "shifted" left 16 times, then check code symbols with the maximum distance will remain in the register (MDS-code): C(32, 16, 17) [6]. The minimum distance between any code words of this code is 17. If such a code is taken as a linear transformation of a block cipher, then it will have the maximum dispersion property (d=17).

The operating sequence for one cycle of the LFSR is the following:

an initial state—a vector $X = (q_{15}, q_{14}, \ldots, q_2, q_1, q_0)$, where $q_i \in GF(2^8)$, $0 \leq i \leq 15$. The vector X has 16 coordinates disposed from left to right in 16 stages of the LFSR, starting from the coordinate with the index i=15;
in operation of a Galois LFSR only the value $q_{15}$ in the highest stage is involved in obtaining the feedback function value;
an output state—a vector $Y = (q'_{15}, q'_{14}, \ldots, q'_2, q'_1, q'_0)$, where $q'_i \in GF(2^8)$, $0 \leq i \leq 15$. Vales $q'_i$ for each i= 15, ..., 1 are computed as $$q'_i = h_i \cdot q_{15} \oplus q_{i-1},$$

while $q'_0 = h_0 \cdot q_{15}$

The linear transformation L of the original data vector $$X = (q_{15}, q_{14}, \ldots, q_2, q_1, q_0)$$

will refer herein to 16 operating cycles of the LFSR.

The transformation results in a new state of the register at the m-th cycle, which can be written down as $$Y = (q'_{15}, q'_{14}, \ldots, q'_2, q'_1, q'_0),$$

where $q'_i \in GF(2^8)$, $0 \leq i \leq 15$ are values of stages of the LFSR.

The reverse transformation $L^{-1}$ takes 16 operating cycles of the LFSR in the reverse direction.

Let us denote some divisor of the number m=16 as k (the selection thereof is defined by the available processor word W and available amount of memory M).

The essence of the present way of implementing on an appropriate platform depends on the value k and is based on applying the superposition principle when considering the effect of each bit of the current state of the LFSR on the subsequent state, in accordance with the fact that for each k there is a way to implement the transformation L at an (nk)-bit processor.

The following cases will be discussed hereinbelow.

Figure 1:
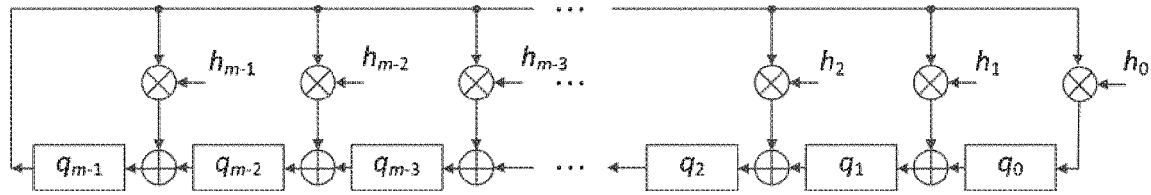
FIG. 1 shows a workflow of a Galois-type linear feedback shift register in the forward direction.

Computation case 1: k=1. This case considers the way of implementing the transformation L at 8-bit processors $(n \cdot k = 8 \cdot 1 = 8)$. For this case the following steps are performed:

computing a number r of required computable tables $$H_j, j = 15, \ldots, 0$$

$$r = \frac{m}{k} = \frac{16}{1} = 16$$

computing 16 tables $H_j$, $j=15, \ldots, 0$, each having $nk=8 \cdot 1=8$ elements, where the elements are 8-bit numbers (elements of the field $GF(2^8)$), by performing the following steps:

computing a respective state of the LFSR (FIG. 1) after k=1 operating cycles for each initial state $$X = (q_{m-1}, q_{m-2}, \ldots, q_2, q_1, q_0) = \left(q_{15}, \underbrace{0, \ldots, 0}_{15 \text{ times}}\right)$$

for all $q_{15} = 2^l$, $l=0, \ldots, 7$, i.e. the effect of each bit of the number $q_{15}$ on the state of the LFSR (FIG. 1) after k=1 operating cycles is considered; the result is nk=8 states;

forming an array A of nk=8 obtained states in such a way that its last row corresponds to the state at j=m-k=16-1=15 and l=0, and the penultimate road corresponds to the state at j=m-k=16-1=15 and l=1, and so on. As a result of doing so, the array A has nk=8 rows and m=16 columns. The first column of the array A corresponds to values of the stage $q_{15}$, the second one—to $q_{14}$, and so on (Table 1);

when k=1, the tables $H_j$, j=15, ..., 0 are equal to each column of the array A in accordance with indices.

TABLE 1

Results of LFSR operation after one cycle

Figure 5:
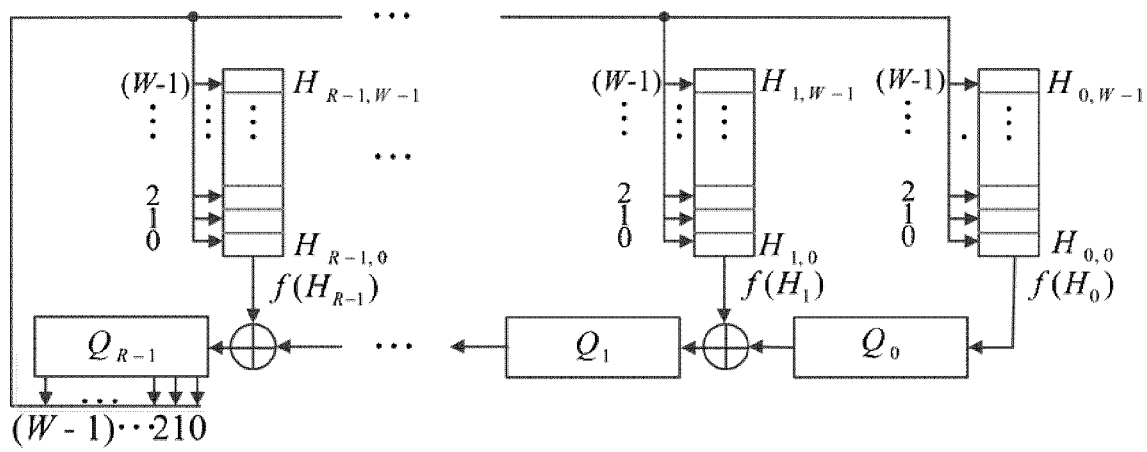
FIG. 5 shows a workflow of a modified Galois-type linear feedback shift register.
Figure 6:
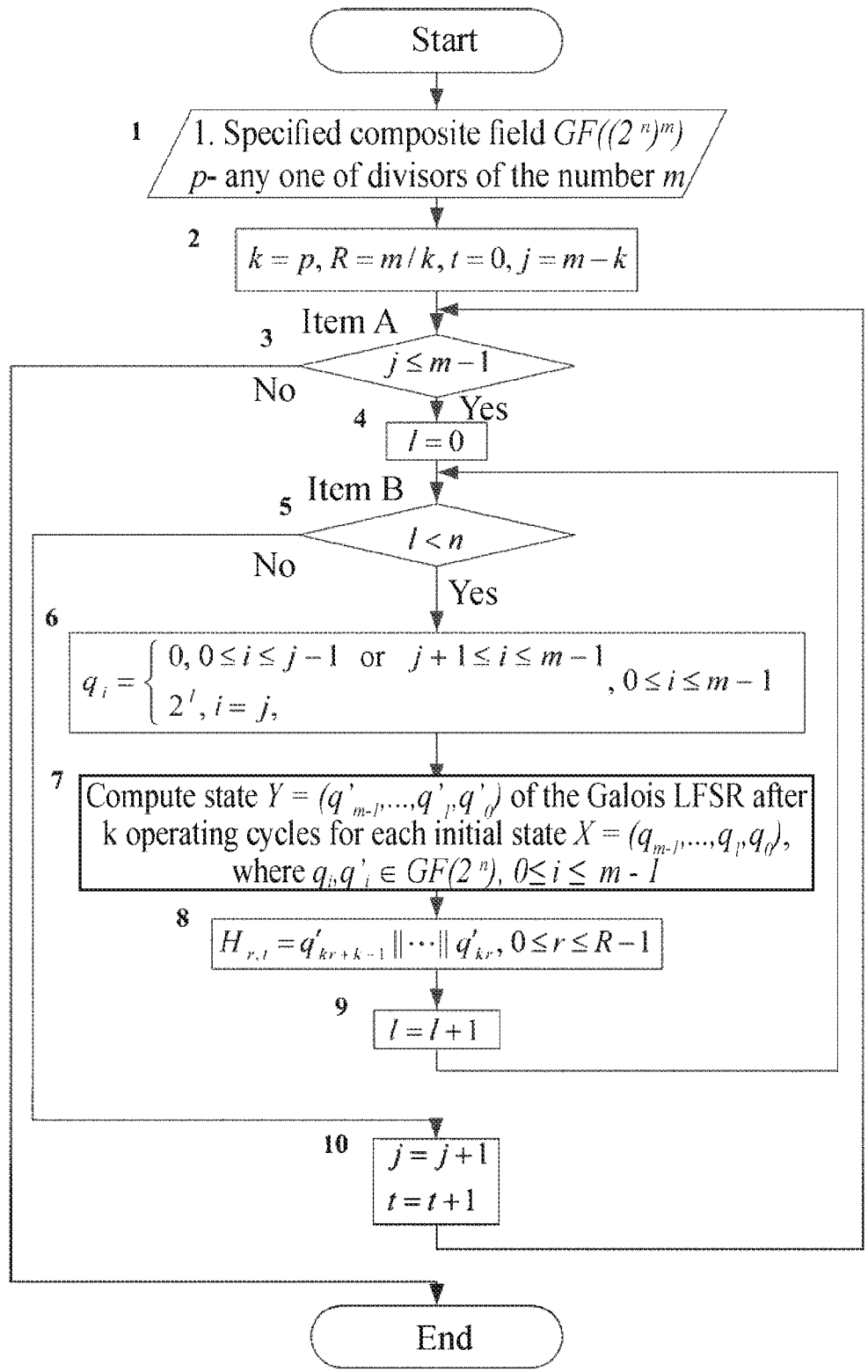
FIG. 6 shows a flow chart of an algorithm for computing feedback function tables of the modified Galois-type linear feedback shift register.
Figure 7:
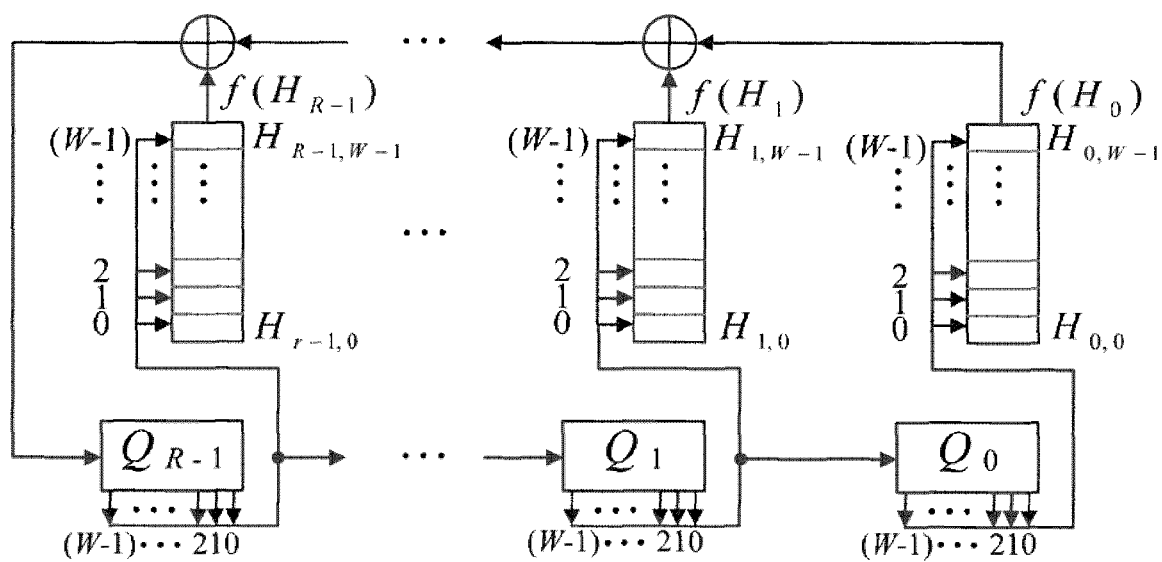
FIG. 7 shows a workflow of a modified Fibonacci-type linear feedback shift register.
Figure 8:
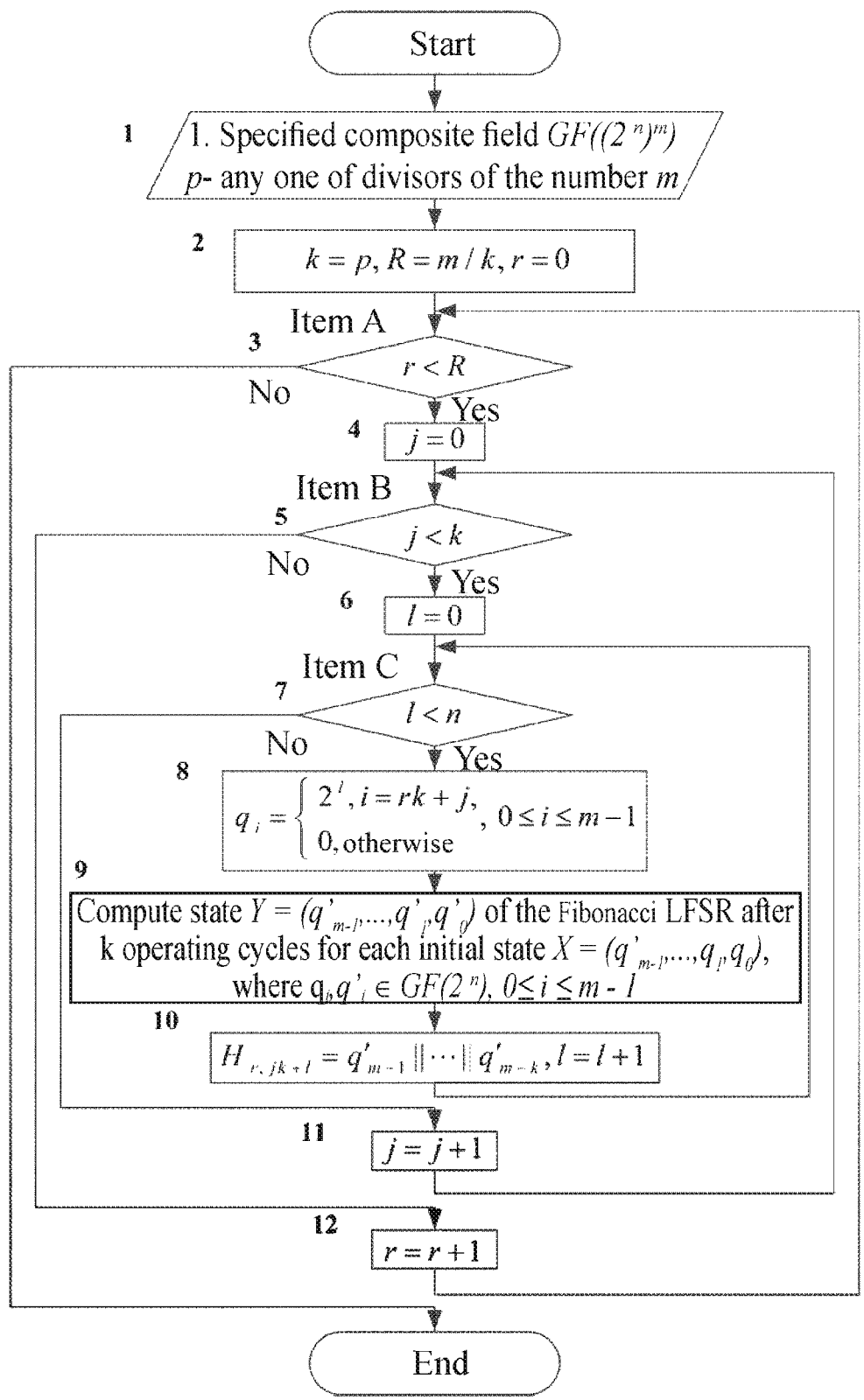
FIG. 8 shows a flow chart of an algorithm for computing feedback function tables of the Fibonacci-type modified linear feedback shift register.

| Initial states $q_{15}, \ldots, q_0$ | States of LFSR | | | | | | | | | | | | | | | |
|---|---|---|---|---|---|---|---|---|---|---|---|---|---|---|---|---|
| | H15 | H14 | H13 | H12 | H11 | H10 | H9 | H8 | H7 | H6 | H5 | H4 | H3 | H2 | H1 | H0 |
| $2^7$, 0, 0, 0, 0, 0, 0, 0, 0, 0, 0, 0, 0, 0, 0, 0 | E5 | 6D | B2 | D7 | 6E | AD | 80 | DE | 80 | AD | 6E | D7 | B2 | 6D | E5 | 80 |
| $2^6$, 0, 0, 0, 0, 0, 0, 0, 0, 0, 0, 0, 0, 0, 0, 0 | 93 | D7 | 59 | 8A | 37 | B7 | 40 | 6F | 40 | B7 | 37 | 8A | 59 | D7 | 93 | 40 |
| $2^5$, 0, 0, 0, 0, 0, 0, 0, 0, 0, 0, 0, 0, 0, 0, 0 | A8 | 8A | CD | 45 | FA | BA | 20 | D6 | 20 | BA | FA | 45 | CD | 8A | A8 | 20 |
| $2^4$, 0, 0, 0, 0, 0, 0, 0, 0, 0, 0, 0, 0, 0, 0, 0 | 54 | 45 | 87 | C3 | 7D | 5D | 10 | 6B | 10 | 5D | 7D | C3 | 87 | 45 | 54 | 10 |
| $2^3$, 0, 0, 0, 0, 0, 0, 0, 0, 0, 0, 0, 0, 0, 0, 0 | 2A | C3 | A2 | 80 | DF | CF | 08 | D4 | 08 | CF | DF | 80 | A2 | C3 | 2A | 08 |
| $2^2$, 0, 0, 0, 0, 0, 0, 0, 0, 0, 0, 0, 0, 0, 0, 0 | 15 | 80 | 51 | 40 | 8E | 86 | 04 | 6A | 04 | 86 | 8E | 40 | 51 | 80 | 15 | 04 |
| $2^1$, 0, 0, 0, 0, 0, 0, 0, 0, 0, 0, 0, 0, 0, 0, 0 | EB | 40 | C9 | 20 | 47 | 43 | 02 | 35 | 02 | 43 | 47 | 20 | C9 | 40 | EB | 02 |
| $2^0$, 0, 0, 0, 0, 0, 0, 0, 0, 0, 0, 0, 0, 0, 0, 0 | 94 | 20 | 85 | 10 | C2 | C0 | 01 | FB | 01 | C0 | C2 | 10 | 85 | 20 | 94 | 01 | generating an extended LFSR configuration (FIG. 5) which has r=16 stages, each having a value representing an 8-bit number;

denoting a state of the extended LFSR as $(Q_{15}, Q_{14}, \ldots, Q_2, Q_1, Q_0)$, where $Q_i \in GF(2^8)$, i=15, 14, ..., 0;

determining a value $f(H_j)$ of the feedback function for each $H_j$ by the formula $$f(H_j) = \bigoplus_{u=0}^{7} w_{15,u} \cdot H_{j,u},$$

where $j = 15, \ldots, 1, 0,$ $w_{15,u} \in GF(2)$ u=0, 1, ..., 7-bits of the stage $Q_{15}$ of the extended LFSR.

This means that if the u-th bit of the stage $Q_{15}$ equals unity, then the respective row $H_{j,u}$ participates in the process of deriving the feedback function value.

The forward linear transformation L comprises r=16 cycles of the extended LFSR;

The 16 cycles of the extended. LFSR require $$r \cdot n \cdot k = \frac{m}{k} \cdot n \cdot k = m \cdot n = 16 \cdot 8 = 128$$

"true-false" check operations for all bits of the stage $Q_{15}$ and $$r \cdot r \cdot n \cdot k = \frac{m}{k} \cdot \frac{m}{k} \cdot n \cdot k = \frac{m^2 \cdot n}{k} = \frac{16^2 \cdot 8}{1} = 2048$$

modulo-2 addition operations for two n×k-bit numbers $Q_l$ and $H_{l,j}$, where l=0, 1, ..., r-1 and j=0, 1, ..., nk.

The required amount of memory is $$r \cdot (n \cdot k) \cdot (n \cdot k) = \frac{m}{k} \cdot (n \cdot k)^2 = m \cdot n^2 \cdot k = 16 \cdot 8^2 \cdot 1 = 1024$$

bits=128 bytes for storing 16 tables $H_j$, j=15, ..., 0.

Figure 2:
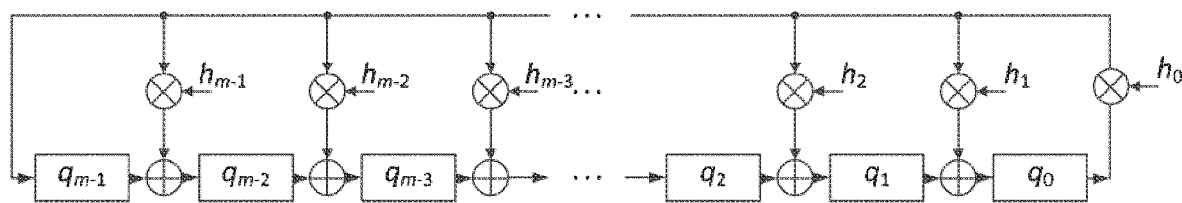
FIG. 2 shows a workflow of the Galois-type linear feedback shift register in the reverse direction.
Figure 3:
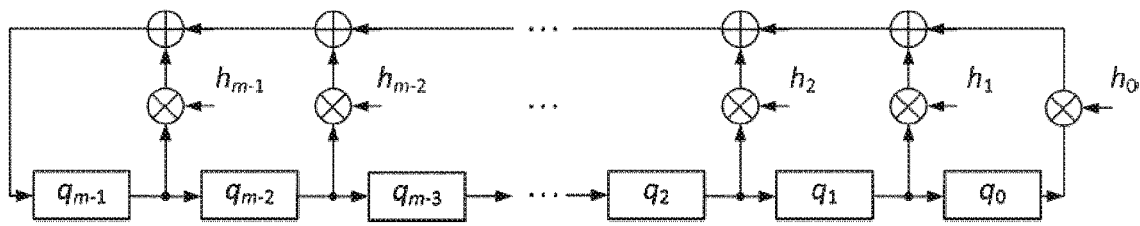
FIG. 3 shows a workflow of a Fibonacci-type linear feedback shift register in the forward direction.
Figure 4:
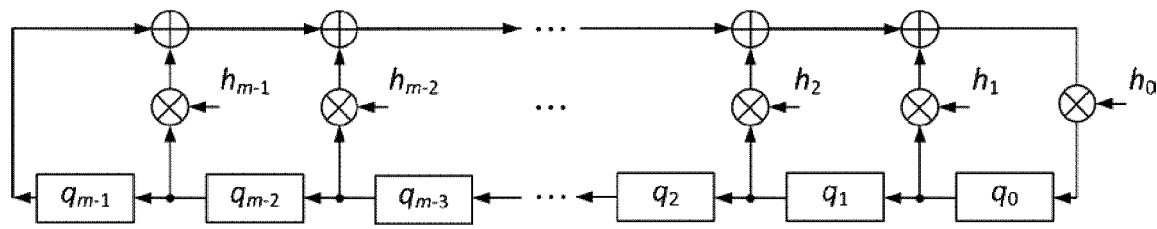
FIG. 4 shows a workflow of the Fibonacci linear feedback shift register in the reverse direction.

The order of implementing the reverse linear transformation $L^{-1}$ at 8-bit processors is performed similarly, using the LFSR (FIG. 2) for computing 16 tables $H_j$, j=15, ..., 0. Due to symmetry of the external irreducible polynomial h(y) for the discussed linear transformation, the same 16 tables $H_j$, j=15, ..., 0 can be used both for the forward transformation and for the transformation reverse thereto.

Computation case 2: k=2. In this case a method of implementing the transformation L at 16-bit processors is considered. The method comprises the following steps:

Computing a number r of required computable tables $H_j$, j=7, ..., 0

$$r = \frac{m}{k} = \frac{16}{2} = 8$$

computing r=8 tables, $H_j$, j=7, ..., 0, each having nk=8·2=16 elements, where the elements are 16-bit numbers, by performing the following steps:

computing a respective state of the LFSR (FIG. 1) after k=2 operating cycles for each initial state $$X = (q_{m-1}, q_{m-2}, \ldots, q_2, q_1, q_0) = \left(q_{15}, q_{14}, \underbrace{0, \ldots, 0}_{14 \text{ times}}\right)$$

for all $q_j = 2^l$, j=14,15 и l=0, ..., 7, beginning from the stage at the position j=m−5=16−2=14, i.e. the effect of each bit of the number $q_{15} \| q_{14}$ on the state of the LFSR is considered (FIG. 1) after k=2 cycles. nk=16 states are obtained as a result:

generating an array A of nk=16 obtained states such that its last row corresponds to the state at j=m−k=16−2=14 and l=0, and its penultimate row corresponds to the state at j=m−k=16−2=14 and l=1, and so on, and the first row of the array A corresponds to the state at j=m−1=16−1=15 and l=n−1=8−1=7. As a result of doing so, the array A has nk=16 rows and m=16 columns;

forming r=8 tables $H_j$, j=7, ... 0, beginning from the value j=(r−1)=8−1=7, by concatenating k=2 values in adjacent columns of the array A, beginning from its first column, wherein the numbering in performed in such a way that, e.g. for the table $H_7$, the value in the first row of the first column after the concatenation corresponds to $H_{7,15}$, while the value in the last row of the same column corresponds to $H_{7,0}$ (Table 2).

TABLE 2

| | States of LFSR after two operating cycles | | | | | | | | |
|---|---|---|---|---|---|---|---|---|---|
| | Initial states | States of LFSR after concatenation of two adjacent stages | | | | | | | |
| No | $q_{15}, \ldots, q_0$ | $H_7$ | H6 | H5 | H4 | H3 | H2 | H1 | H0 |
| 15 | $2^7$, 0, 0, 0, 0, 0, 0, 0, 0, 0, 0, 0, 0, 0, 0, 0 | 3222 | 2526 | 4266 | 3B76 | 4888 | 38FA | 9F75 | DFE5 |
| 14 | $2^6$, 0, 0, 0, 0, 0, 0, 0, 0, 0, 0, 0, 0, 0, 0, 0 | 1911 | F313 | 2133 | FC3B | 2444 | 1C7D | AEDB | 8E93 |
| 13 | $2^5$, 0, 0, 0, 0, 0, 0, 0, 0, 0, 0, 0, 0, 0, 0, 0 | EDE9 | 98E8 | F1F8 | 7EFC | 1222 | 0EDF | 578C | 47A8 |
| 12 | $2^4$, 0, 0, 0, 0, 0, 0, 0, 0, 0, 0, 0, 0, 0, 0, 0 | 9795 | 4C74 | 997C | 3F7E | 0911 | 078E | CA46 | C254 |
| 11 | $2^3$, 0, 0, 0, 0, 0, 0, 0, 0, 0, 0, 0, 0, 0, 0, 0 | AAAB | 263A | AD3E | FE3F | E5E9 | E247 | 6523 | 612A |
| 10 | $2^2$, 0, 0, 0, 0, 0, 0, 0, 0, 0, 0, 0, 0, 0, 0, 0 | 55B4 | 131D | B71F | 7FFE | 9395 | 71C2 | D3F0 | D115 |
| 9 | $2^1$, 0, 0, 0, 0, 0, 0, 0, 0, 0, 0, 0, 0, 0, 0, 0 | CB5A | E8EF | BAEE | DE7F | A8AB | D961 | 8878 | 89EB |
| 8 | $2^0$, 0, 0, 0, 0, 0, 0, 0, 0, 0, 0, 0, 0, 0, 0, 0 | 842D | 7496 | 5D77 | 6FDE | 54B4 | 8DD1 | 443C | A594 |
| 7 | 0, $2^7$, 0, 0, 0, 0, 0, 0, 0, 0, 0, 0, 0, 0, 0, 0 | E56D | B2D7 | 6EAD | 80DE | 80AD | 6ED7 | B26D | E580 |
| 6 | 0, $2^6$, 0, 0, 0, 0, 0, 0, 0, 0, 0, 0, 0, 0, 0, 0 | 93D7 | 598A | 37B7 | 406F | 40B7 | 378A | 59D7 | 9340 |
| 5 | 0, $2^5$, 0, 0, 0, 0, 0, 0, 0, 0, 0, 0, 0, 0, 0, 0 | A88A | CD45 | FABA | 20D6 | 20BA | FA45 | CD8A | A820 |

TABLE 2-continued

States of LFSR after two operating cycles

| | Initial states | States of LFSR after concatenation of two adjacent stages | | | | | | | |
|---|---|---|---|---|---|---|---|---|---|
| No | $q_{15}, \ldots, q_0$ | $H_7$ | H6 | H5 | H4 | H3 | H2 | H1 | H0 |
| 4 | 0, $2^4$, 0, 0, 0, 0, 0, 0, 0, 0, 0, 0, 0, 0, 0, 0 | 5445 | 87C3 | 7D5D | 106B | 105D | 7DC3 | 8745 | 5410 |
| 3 | 0, $2^3$, 0, 0, 0, 0, 0, 0, 0, 0, 0, 0, 0, 0, 0, 0 | 2AC3 | A280 | DFCF | 08D4 | 08CF | DF80 | A2C3 | 2A08 |
| 2 | 0, $2^2$, 0, 0, 0, 0, 0, 0, 0, 0, 0, 0, 0, 0, 0, 0 | 1580 | 5140 | 8E86 | 046A | 0486 | 8E40 | 5180 | 1504 |
| 1 | 0, $2^1$, 0, 0, 0, 0, 0, 0, 0, 0, 0, 0, 0, 0, 0, 0 | EB40 | C920 | 4743 | 0235 | 0243 | 4720 | C940 | EB02 |
| 0 | 0, $2^0$, 0, 0, 0, 0, 0, 0, 0, 0, 0, 0, 0, 0, 0, 0 | 9420 | 8510 | C2C0 | 01FB | 01C0 | C210 | 8520 | 9401 | generating an extended configuration of the LFSR, where the extended LFSR has r=8 stages, each having a value representing a 16-bit number;

a state of the extended LFSR can be represented as $(Q_7, Q_6, \ldots, Q_2, Q_1, Q_0)$ determining a value $f(H_j)$ of the feedback function for each $H_j$ by the formula $$f(H_j) = \bigoplus_{u=0}^{15} w_{7,u} \cdot H_{j,u},$$

where $j = 7, \ldots, 1, 0,$ $w_{7,u} \in GF(2)$ u=0, 1, . . . , 15-bits of the stage $Q_7$ of the extended LFSR.

This means that, if the ii-th bit of the stage $Q_{15}$ equals unity, then the respective row $H_{j,u}$ participates in the process of deriving the feedback function value.

The forward linear transformation L comprises r=8 operating cycles of the extended LFSR, where the 8 operating cycles of the extended LFSR require $$r \cdot n \cdot k = \frac{m}{k} \cdot n \cdot k = m \cdot n = 16 \cdot 8 = 128$$

"true-false" check operations and $$r \cdot r \cdot n \cdot k = \frac{m}{k} \cdot \frac{m}{k} \cdot n \cdot k = \frac{m^2 \cdot n}{k} = \frac{16^2 \cdot 8}{2} = 1024$$

modulo-2 addition operations of two 16-bit numbers.

The required amount of memory is $$r \cdot (n \cdot k) \cdot (n \cdot k) = \frac{m}{k} \cdot (n \cdot k)^2 = m \cdot n^2 \cdot k = 16 \cdot 8^2 \cdot 2 = 2048$$

bits=256 bytes for storing 8 tables $H_j$, j=7, . . . , 0.

Figure 12:
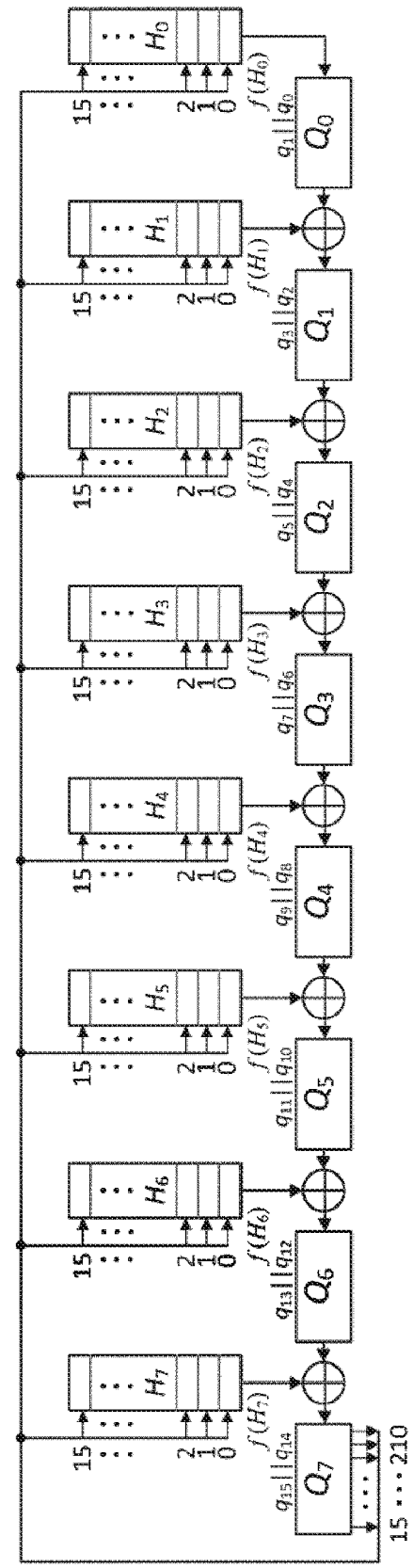
FIG. 12 shows a workflow of a modified 16-bit Galois-type linear feedback shift register for a forward linear transformation, illustrating an embodiment of the method.

FIG. 12 shows the obtained resulting configuration.

The order of implementing the reverse linear transformation $L^{-1}$ at 16-bit processors is performed similarly with the use of the LFSR (FIG. 2) to form 8 tables $H_j$, j=7, . . . , 0. Due to symmetry of the external irreducible polynomial h(y) for the discussed linear transformation, the same 8 tables $H_j$, j=7, . . . , 0 can be used to implement both the forward transformation and the transformation reverse thereto.

Figure 13:
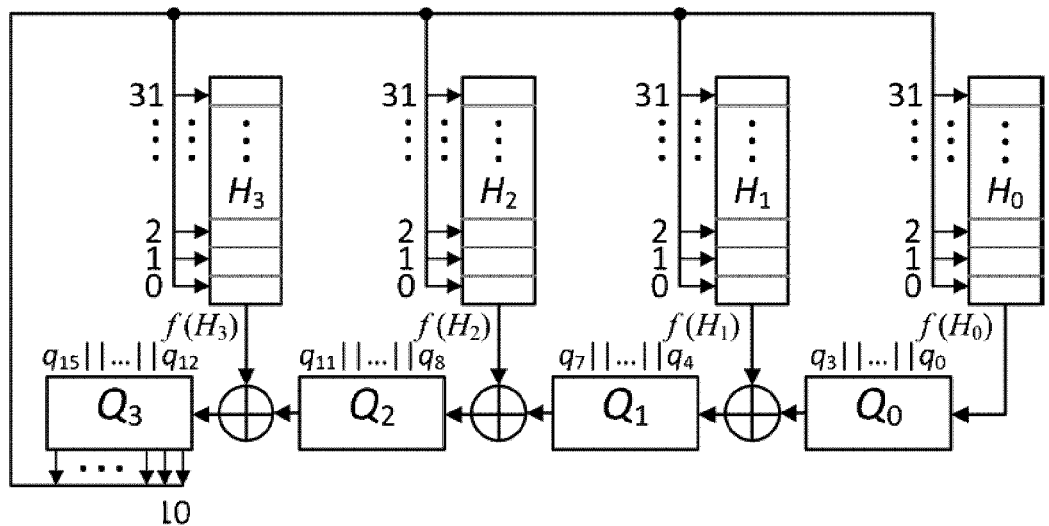
FIG. 13 shows a workflow of a modified 32-bit Galois-type linear feedback shift register for a forward linear transformation, illustrating an embodiment of the method.
Figure 14:
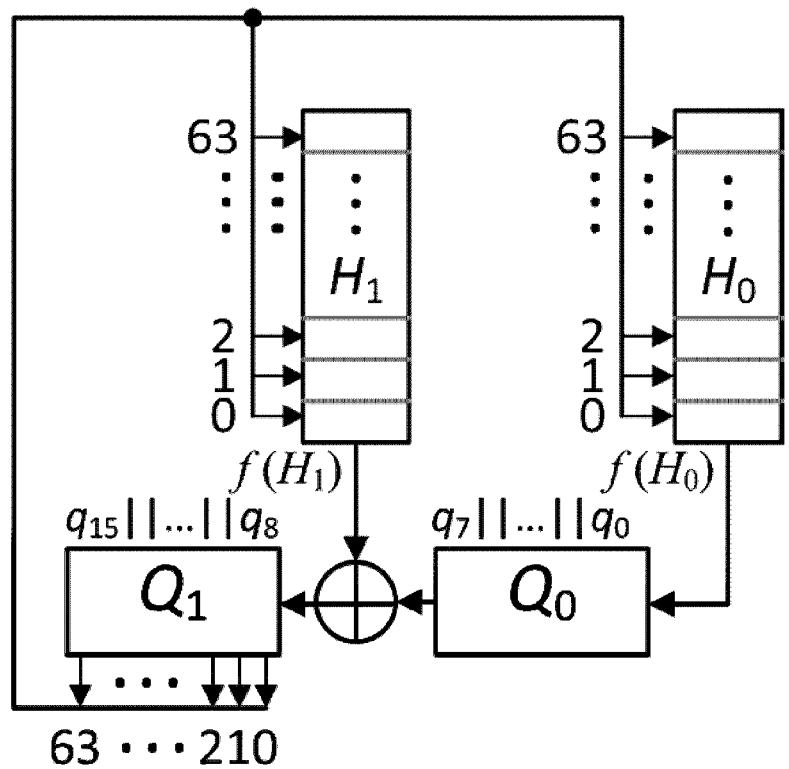
FIG. 14 shows a workflow of a modified 64-bit Galois-type linear feedback shift register for a forward linear transformation, illustrating an embodiment of a method.

Similarly, at k=4 and k=8, the forward linear transformation L and the one reverse thereto can be implemented at 32 and 64-bit processors (FIGS. 13 and 14, respectively).

Table 3 shows the results of calculations of numerical values typical to preforming the present method using the Galois-type LFSR.

TABLE 3

Results of calculations of numerical values typical to preforming the present method using the Galois LFSR

| Word size of the processor used | Number of required "true/false" checks | Amount of required memory, bytes | Number of modulo-2 additions of two memory stages | Required number of processor cycles |
|---|---|---|---|---|
| 8 | 128 | 128 | 2048 | 16 |
| 16 | 128 | 256 | 1024 | 8 |
| 32 | 128 | 512 | 512 | 4 |
| 64 | 128 | 1024 | 256 | 2 |

Comparative analysis of values presented in Table 3 shows that the present method makes it possible to select inter-related parameters of the computing system.

For example, if a 8-bit processor is available, then implementation of the specified linear transformation will require the minimum memory amount of 128 bytes and 16 shift operations for sixteen bytes.

If a more powerful 64-bit processor is available, then implementation of the specified linear transformation will require 1024 bytes of memory and only 2 shift operations for two 64-bit words.

As a result, the use of the present method also offers additional opportunities to developers in designing an application program or a hardware unit of a computing system that implements the linear transformation, and taking into account the requirements emerging in practice.

REFERENCES CITED

1. EA 1514174.
2. U.S. Pat. No. 5,946,473
3. Nicolay Borisenko, Nguyen Van Long, Alexey Bulygin, Algorithm design software and hardware implementation of large size linear mapping. 2nd Workshop on Current Trends in Cryptology (CTC pt 2013) Jun. 23-25, 2013, Ekaterinburg, Russia. Pre-proceedings, pp. 192-205:
4. Mikhail Borodin, Andrey Rybkin, Alexey Urivskiy. High-Speed Software Implementation of the Prospective 128-bit Block Cipher and Streebog Hash-Function, 3rd Workshop on Current Trends in Cryptology (CTCrypt 2014) Jun. 5-6, 2014, Moscow, Russia. Pre-proceedings, pp. 189-197;

5. Kuzmin A. S., Nechaev A. A., Linear recurring sequences over Galois rings, Algebra and Logic, 3:2 (1995), pp. 169-189;
6. Couselo E., Gonzalez S., Markov V. T., Nechaev A. Recursive MDS-codes and recursively differentiable quasigroups. Discrete Mathematics, Volume 10, Issue 2, 1998, pp. 3-29.

The invention claimed is:

1. A method of linear transformation of a message S represented in a binary form, by a processor in a computing system having a word size W of the processor equal to an integer power of 2 and an available amount of memory of M bits, the method comprising:
setting a size s of the message S, where s is multiple of W;
setting a value n of a number of bits of a linear feedback shift register (LFSR) according to a Galois configuration, so that $$n = \frac{W}{2^N}$$

is met, where $N \in 0, 1, 2, \ldots$;
generating the LFSR according to the Galois configuration with the following parameters:
an internal primitive polynomial $$f(x) = x^n \oplus \sum_{i=0}^{n-1} a_i x^i,$$

$a_i \in GF(2)$ an external polynomial $$h(y) = y^m \oplus \sum_{i=0}^{m-1} h_i y^i,$$

where $m = \frac{s}{n}$ is a number of stages of the LFSR, wherein $h_i \in GF(2^n)$,
an initial state of the stages of the LFSR, $q_i$, forming a data vector $X=(q_{m-1}, q_{m-2}, \ldots q_2, q_1, q_0)$, wherein $q_i \in GF(2^n)$, $0 \le i \le m-1$,
an output state of the stages of the LFSR, $q'_i$, for one operating cycle, forming a vector $Y=(q'_{m-1}, q'_{m-2}, \ldots q'_2, q'_1, q'_0)$, wherein $q'_i \in GF(2^n)$, $0 \le i \le m-1$, where $q'_i = h_i \cdot q_{m-1} \oplus q_{i-1}$, for $1 \le i \le m-1$, $q'_0 = h_0 \cdot q_{m-1}$;
defining all divisors of the number m as values $p_0$, $p_1, \ldots, p_d$, while $p_0 < p_1 \le p_d$;
selecting a maximum possible divisor p from $$p \le \frac{M}{sn};$$

modifying the LFSR by computing R number of matrices $H_r$, where $r=(R-1), \ldots, 0$, with a size of n×k rows, each having a length of n×k bits, the R number of matrices $H_r$ being computed by performing the following actions:
computing k=p,
computing $$R = \frac{m}{k};$$

computing j=m-k;
computing t=0;
(A1) if j≤m-1 is not met, then going to step A3;
computing l=0,
(A2) if l<n is not met, then computing j=j+1, t=t+1, going to step A1;
setting an initial state of the LFSR $$X = (q_{m-1}, \ldots, q_1, q_0),$$

$$q_i = \begin{cases} 0, 0 \le i \le j-1 \text{ or } j+1 \le i \le m-1 \\ 2^l, i = j, \end{cases}, 0 \le i \le m-1,$$

where $q_i \in GF(2^n)$;

computing, after k cycles for each initial state, a new state of the LFSR $Y=(q'_{m-1}, \ldots q'_1, q'_0)$, where $q'_i \in GF(2^n)$, $0 \le i \le m-1$;
computing t-th values for all matrices $H_i$, i=r-1 \ldots 0 by concatenating k values of stages q' $H_{r,t} = q'_{kr+k-1} \| \ldots \| q'_{kr}$, wherein $0 \le r \le R-1$
computing l=l+1, going to step A2;
(A3) recording, into stages of the modified LFSR, blocks of the original message S, where an initial state of the stages of the modified LFSR, $q_i$, forms the vector $X'=(Q_{R-1}, \ldots, Q_1, Q_0)$, where $Q_r = q_{kr+k-1} \| \ldots \| q_{kr}$, wherein $0 \le r \le R-1$;
executing R number of operating cycles of the modified LFSR by executing in each cycle the following actions:
computing an output state of the stages of the modified LFSR, $Q'_i$, for one cycle, thereby forming a vector $Y'=(Q'_{R-1}, \ldots, Q'_1, Q'_0)$, each value $Q'_i$ of said vector being computed by the formula $Q'_i = f(H_i) \oplus Q_{i-1}$ for each $i = R-1, \ldots, 1$, wherein
$Q'_0 = f(H_0)$,
where $$f(H_r) = \bigoplus_{j=0}^{W-1} z_{R-1,j} \cdot H_{r,j},$$

where $z_{R-1,j}$ is a value of a j-th bit of vector $Q_{R-1}$, wherein $r = R-1, \ldots, 1$, $0 j=0, 1, \ldots, W-1$, $z_{R-1,j} \in GF(2)$;
obtaining, after executing the R number of operating cycles of the LFSR, a linear transformation of the blocks s of the message S;
reading out, from the stages of the modified LFSR, blocks S of a linearly transformed message S; and
combining the blocks and obtaining the linearly transformed message S.

2. A method of linear transformation of a message S represented in a binary form by a processor in a computing system having a word size W of the processor equal to an integer power of 2 and an available amount of memory of M bits, the method comprising:

setting a size s of the message S, where s is multiple of W;
setting a value n of a number of bits of a linear feedback shift register (LFSR) according to a Fibonacci configuration, so that $$n = \frac{W}{2^N}$$

is met, where $N \in 0, 1, 2, \ldots$;
generating the LFSR according to the Fibonacci configuration with the following parameters:
an internal primitive polynomial $$f(x) = x^n \oplus \sum_{i=0}^{n-1} a_i x^i,$$

$$a_i \in GF(2)$$

an external polynomial $$h(y) = y^m \oplus \sum_{i=0}^{m-1} h_i y^i,$$

where $m = \frac{s}{n}$ is a number of stages in the LFSR, wherein $h_i \in GF(2^n)$,
an initial state of the stages of the LFSR, $q_i$, forming a vector $X=(q_{m-1}, q_{m-2}, \ldots, q_2, q_1, q_0)$, wherein $q_i \in GF(2^n)$, $0 \le i \le m-1$,
an output state of the stages of the LFSR, $q'_i$, for one cycle, forming a vector $Y=(q'_{m-1}, q'_{m-2}, \ldots q'_2, q'_1, q'_0)$, wherein $q'_i \in GF(2^n)$, $0 \le i \le m-1$, where $q'_i = q_{i+1}$, for each $i=0, \ldots, m-2$, $$q'_{m-1} = \bigoplus_{i=0}^{m-1} h_i \cdot q_i$$

defining all divisors of the number m as values $p_0, p_1, \ldots, p_d$, where $p_0 < p_1 < \ldots p_d$;
selecting a maximum possible divisor p from $$p \le \frac{M}{sn};$$

modifying the LFSR by computing
R number of matrices $H_r$, where $r=(R-1), \ldots, 0$, with a size of n×k rows, each having a length of n×k bits, the R number of matrices $H_r$ being computed by performing the following actions:
computing k=p,
computing $$R = \frac{m}{k};$$

computing r=0;
(A5) if r<R is not met, then going to step A7;
computing j=0,
(A6) if j<k is not met, then computing r=r+1, going to step A5;
computing l=0,
if l<n is not met, then computing j=j+1, going to step A6;
setting an initial state of the LFSR $X=(q_{m-1}, q_{m-2}, \ldots, q_1, q_0)$, where $q_i$, $q'_i \in GF(2^n)$, $0 \le i \le m-1$ $$q_i = \begin{cases} 2^l, & i = rk + j \\ 0, & \text{otherwise} \end{cases}, 0 \le i \le m-1,$$

computing, after k operating cycles for each initial state, a new state of the LFSR $Y=(q'_{m-1}, q'_{m-2}, \ldots, q'_1, q'_0)$,
computing a (jk+1)-th value for a matrix $H_r$ by concatenating k values of stages $q'_{m-1}, q'_{m-2}, \ldots, q'_{m-k}$ $H_{r,jk+1} = q'_{m-1} \| \ldots \| q'_{m-k}$,
computing l=l+1 going to step A6;
(A7) recording, into stages of a modified LFSR, blocks s of the original message S, where an initial state of the stages of the modified LFSR, $q_i$, forms a vector $X'=(Q_{R-1}, \ldots, Q_1, Q_0)$, where $Q_r = q_{kr+k-1} \| \ldots \| q_{kr}$, and also $0 \le r \le R-1$;
executing R number of cycles of the modified LFSR by executing at each cycle the following actions:
computing an output state of the stages of the modified LFSR $Q'_i$ for one cycle, thereby forming the vector $Y'=(Q'_{R-1}, \ldots, Q'_1, Q'_0)$, each value $Q'_i$ of said vector being computed by the formula $Q'_i = Q_{i+1}$ for each $i=0, \ldots, R-2$, and a value $Q'_{m-1}$ is computed from $$Q'_{R-1} = \bigoplus_{r=0}^{R-1} f(H_r),$$

where $f(H_r) = \bigoplus_{j=0}^{W-1} z_{r,j} \cdot H_{r,j},$ where $z_{r,j}$ is a value of a j-th bit of a vector $Q_r$, wherein $r=R-1, \ldots, 1, 0$, $j=0, 1, \ldots, W-1$, $z_{r,j} \in GF(2)$;
obtaining, after executing the R number of cycles of the LFSR, a linear transformation of the blocks S of the message S;
reading out, from the stages of the modified LFSR, blocks s of a linearly transformed message S; and
combining the blocks and obtaining the linearly transformed message S.

* * * * *

UNITED STATES PATENT AND TRADEMARK OFFICE
CERTIFICATE OF CORRECTION

PATENT NO. : 10,601,582 B2
APPLICATION NO. : 15/513823
DATED : March 24, 2020
INVENTOR(S) : Borisenko et al.

Page 1 of 1

It is certified that error appears in the above-identified patent and that said Letters Patent is hereby corrected as shown below:

In the Claims

In Line 31 of Claim 1 (which appears in Column 19, Line 56), the formula should read:
$p_0 < p_1 < \ldots p_d$ In Line 75 of Claim 1 (which appears in Column 20, Line 54):
A "," should appear between "0" and "j ="

Signed and Sealed this
Twenty-first Day of July, 2020

Andrei Iancu
*Director of the United States Patent and Trademark Office*